(No Model.)
T. R. McKNIGHT.
ROAD SCRAPER.
No. 470,208. Patented Mar. 8, 1892.
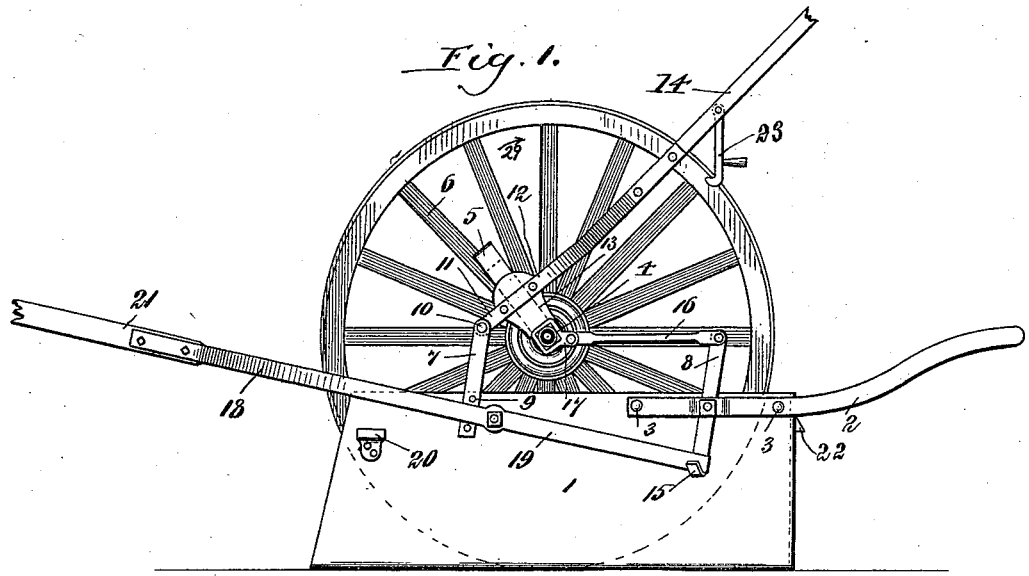
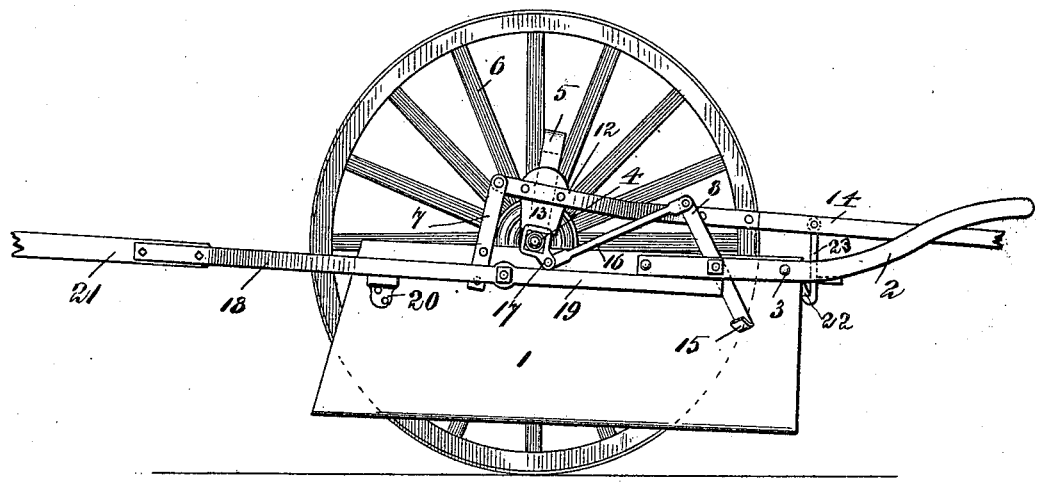
Witnesses
John L. Jackson
W. Rossiter
Inventor
Thomas R. McKnight
By Dodd & Adams
Attys.

UNITED STATES PATENT OFFICE.

THOMAS R. McKNIGHT, OF AURORA, ILLINOIS, ASSIGNOR TO THE WESTERN WHEEL SCRAPER COMPANY, OF SAME PLACE.

ROAD-SCRAPER.

SPECIFICATION forming part of Letters Patent No. 470,208, dated March 8, 1892.

Application filed June 11, 1891. Serial No. 395,952. (No model.)

*To all whom it may concern:*

Be it known that I, THOMAS R. McKNIGHT, a citizen of the United States, residing at Aurora, in the county of Kane and State of Illinois, have invented certain new and useful Improvements in Road-Scrapers, of which the following is a specification, reference being had to the accompanying drawings, in which—

Figure 1 is a side elevation, one wheel being removed, showing the scraper in position for loading. Fig. 2 is a similar view showing the scraper ready for dumping.

My invention relates to scrapers used in grading roads and for other similar purposes, and more particularly to road-scrapers which are mounted on wheels, and are adapted for a heavier class of work. In road-scrapers which are constructed to be lowered for scraping, lifted for carrying the earth, and tilted over for dumping it has been usual to attach hooks to the scraper-box or draft-bail, which were connected when loading the scraper-box and disconnected for transportation or unloading, which hooks are liable to get in the way or require a complicated draft-bail attachment or hand engagement and disengagement, or are in the way of properly operating the machine.

The objects of my invention are to simplify the construction of scrapers of this class, so that the use of the hooks or catches above referred to will be dispensed with, and to otherwise improve their construction. I accomplish these objects as illustrated in the drawings and as hereinafter specified. That which I regard as new will be pointed out in the claims.

In the drawings, 1 indicates the box of a scraper, which may be of any suitable construction adapted for the purposes for which such implements are ordinarily used, having an open front portion with a sharpened lower edge adapted to scrape up earth into the interior of the box. The box 1 is provided, preferably, at each side of its rear portion, near the upper end, with handles 2, which are secured to the sides of the box by rivets 3 or in any other suitable manner. The handles 2 are adapted to be used to raise the rear portion of the box in the operation of emptying the scraper. The box 1 of the scraper is swung from an axle 4, provided with a central arch 5, and mounted upon wheels 6. The box 1 is suspended from the arched axle 5 by means of straps 7, as shown in the drawings. The straps 7 are rigidly secured at their lower ends by means of rivets 9 or in any other suitable manner to the forward part of the scraper-box, one strap 7 being secured at each side of the scraper. The upper end of each of the two straps 7 is pivotally secured at 10 to an extension 11 of a bail 12, which bail is rigidly secured at each side to the arched axle 5, the arched axle being provided with an enlarged portion 13 at each side adapted to more firmly hold the end of the bail which is attached to it. The construction is such that the extension 11 forms the short arm of a lever, by means of which the scraper-box may be raised.

Secured to the bail 12, preferably at its center, is a lever 14, which is of sufficient length that it may be operated from behind the scraper. The adjustments of the bail 12 upon the arched axle 5 and the length of the strap 7 are such that when the bail 12 is turned downward the arched axle will be brought into a more nearly perpendicular position and the scraper-box will be elevated, as best shown in Fig. 2.

8 8 indicate levers, one of which is pivotally secured to each side of the box 1 near its rear end and preferably passes between the handle 2 and the side of the box, as best shown in Fig. 1. Each lever 8 is provided at its lower end with an upturned portion or hook 15, and at its upper end each lever 8 is pivotally secured to a connecting-rod 16, which is pivotally secured at its opposite end to a lug or ear 17, secured rigidly upon the lower portion of the arched axle 5 near the wheel-journal, as shown in the drawings. The lug 17 projects downward or outward from the arch of the axle, so that when the arch is moved in one direction the lug 17 will move in an opposite direction. By this construction when the arch of the axle moves in the direction indicated by the arrow 29 in Fig. 1 the connecting-rod 16, through the lug 17, will move in an opposite direction and will consequently move the hook 15 upon the lever 8 toward the rear of the scraper, as best shown in Fig. 2.

18 indicates an ordinary draft-bar or bail, which is pivotally secured to the box 1 of the scraper at a point back of the point at which the straps 7 are secured to the box and preferably near the top of the box. An extension 19 of the draft bar or bail is provided at each side, which extends backward to the rear of the pivot and is adapted to fit into the hook 15 upon the lower end of the lever 8 when said lever is in the position shown in Fig. 1.

20 indicate lugs, one of which is secured at each side of the scraper-box in any suitable manner, which lugs are adapted to come against the lower portions of the draft-bail 18. Any suitable tongue 21 may be provided, which is secured to the draft-bail in any suitable manner.

23 indicates an ordinary form of catch, which is loosely pivoted to the lever 14 and is adapted to engage a lug 22 upon the rear of the scraper-box.

When the scraper is in position for loading, as shown in Fig. 1, the scraper-box 1 rests upon the ground and the arched axle 5 is forwardly inclined, as shown, the lever 14 being raised and the straps 7 and levers 8 being in an almost vertical position. The extensions 19 at each side of the draft-bail will then engage with the hooks 15 upon the lower ends of the levers 8. In the process of scraping or loading the scraper the rear end of the scraper will be prevented from rising as the edge of the scraper enters the earth by means of the extensions 19 in the hooks 15, thereby rendering the scraper much more effective.

When the scraper has been loaded and in order to properly prepare it for transporting its load to the point where it is to be dumped, the lever 14 is drawn downward, thereby turning the arched axle to a more nearly vertical position and raising the straps 7. This will cause the front part of the scraper to rise. As the scraper-box is raised through the strap 7 it will raise the pivotal point of the draft-bail 18, thereby bringing said draft-bail into a more nearly horizontal position and causing it to bear upon the upper surfaces of the lugs 20 at each side of the scraper-box. This will raise the rear portion of the scraper, the lugs 20 being so placed that the downward pressure of the draft-bail upon them will give a leverage sufficient to accomplish such result. At the same time the rod 16 will be moved forward through the lug 17 and the upper portion of the lever 8 will be drawn forward, throwing the hook 15 from under the end of the extension 19 of the draft-bail. This will permit of the rear of the scraper being raised by the handles 2 when the point is reached where it is desired to empty the contents of the scraper. The scraper may then be dumped, being tipped over in the ordinary way. When the rear of the scraper is raised to dump its contents, the arched axle 5, bail 12, and lever 14 will also be moved with the scraper-box, and when the scraper is lowered again the parts will return to the position shown in Fig. 2, so that the scraper will be in a condition to be drawn back to the place of loading. The lever 14 may then be raised, and the scraper will again be in readiness to receive another load.

The lug 17 may be cast directly upon the axle, or it may be cast separate with a collar adapted to be placed upon the axle and keyed thereto.

By extending the draft bar or bail back of its pivots, which are in front of the wheel-axle a considerable distance, as shown, and locking these extensions near the rear end of the scraper-box while the load is being filled in, I obtain a rigid connection with the frame and a better control over the scraper-box.

The wheels 6, by which the scraper-box is carried, may be of any common form and are of such size that the box of the scraper may be lowered so that it will rest upon the ground, as shown in Fig. 1. By this construction the necessity for draft-hooks at the front of the scraper for holding the scraper-box while being loaded is avoided.

By my improved construction all the necessary apparatus, excepting the lever for raising or lowering the scraper-box, is located at the sides of the scraper and is therefore out of the way and is much less likely to interfere with the operation of the scraper or to become broken or get out of order.

That which I claim as new, and desire to secure by Letters Patent, is—

1. In a wheeled scraper, the combination, with a carriage, of a scraper-box swung from said carriage, a draft bar or bail pivoted to the scraper-box and having a rear extension back of its pivotal point, a device for engaging the rear extension of the draft bar or bail to prevent the raising of the rear portion of said scraper-box, and a lever adapted to be operated to raise the scraper-box from the ground and to automatically release the said devices from the rear extension of the draft bar or bail for preventing tipping or raising of the rear end of said scraper-box while being loaded, substantially as specified.

2. In a wheeled scraper, the combination, with a carriage having an arched axle, of a scraper-box 1, suspended from the carriage, a draft device connected with the scraper-box and having a rear extension, a bail 12, secured to the arched axle, straps 7, connecting the ends of the bail with the scraper-box, a lever connected to the bail, a rod 16, connected with the axle, and a lever 8, mounted on the scraper-box and connected with the rod, substantially as and for the purposes described.

3. In a wheeled scraper, the combination, with a scraper-box, a carriage having an arched axle, a bail secured to said arched axle, and straps connecting the ends of the bail to the scraper-box, of a rod 16, pivotally connected to said arched axle, a lever 8, having a hook at or near its lower end, and a draft-bail 18, having an extension 19, adapted to engage and disengage said hook, substantially as and for the purpose specified.

4. The combination of the scraper-box 1, the arched axle 5, having a projection 17, the bail 12, having a lever 14, the link 7, connecting the bail with the scraper-box, the rod 16, pivoted to the projection of the axle, the hooked levers 8, mounted on the scraper-box and pivoted to the rod, and the draft-bail 18, pivoted to the scraper-box and having the rear extensions 19 back of its pivotal point for engaging and disengaging the hooked levers, substantially as described.

5. In a wheeled scraper, the combination, with a carriage having an arched axle and a scraper-box suspended from the carriage, of a draft-bail 18, pivoted to the sides of the scraper and having rear extensions back of its pivotal point, stop devices to engage said rear extensions, and lugs 20, secured at opposite sides of the scraper-box and adapted to support the rear end of the scraper-box by said bail when in its raised position, substantially as described.

THOMAS R. McKNIGHT.

Witnesses:
T. H. BEREMAN,
C. H. SMITH.